Patented June 18, 1935

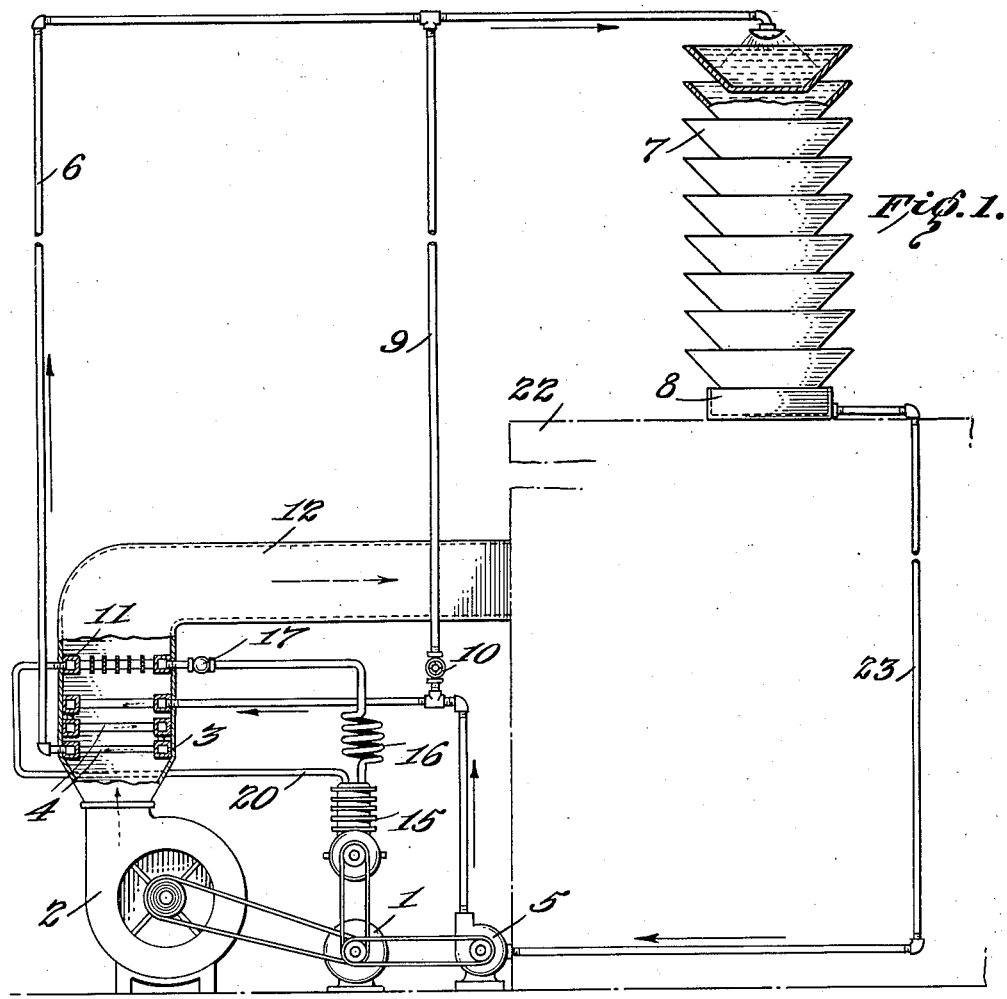
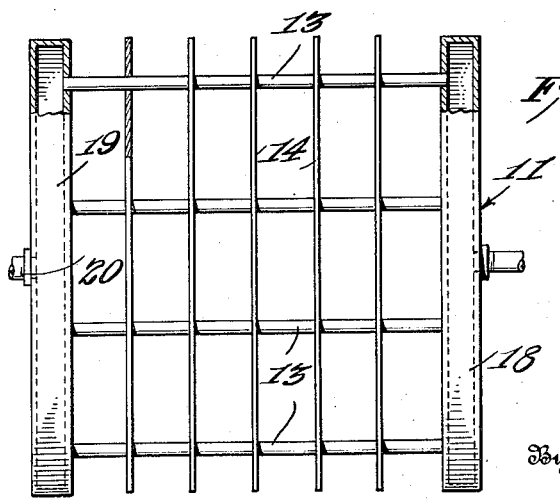
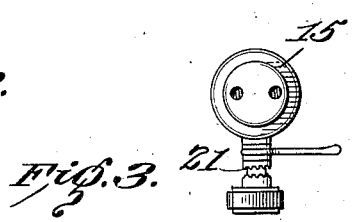

2,005,276

UNITED STATES PATENT OFFICE 2,005,276

SYSTEM FOR CONDITIONING AIR

George P. Tidmarsh and Patrick M. Tidmarsh, Tucson, Ariz.

Application July 18, 1933, Serial No. 681,006

5 Claims. (Cl. 62—129)

This invention relates to systems for conditioning air for buildings.

It is an object of this invention to provide a system for conditioning air which will overcome the great practical obstacles met in the problem involved and which will prove efficient and inexpensive under a wide variety of atmospheric conditions.

It is well known that atmospheric conditions, such as temperature and humidity, are very different during the hot seasons at different localities which are fairly close together. For this reason, difficulties are encountered in devising air conditioning systems which will be suitable for many locations. Many efforts have been made to solve the problem by the use of compression, cooling and expansion of gases. Systems based entirely on this principle have proven too expensive in operation to be considered fully satisfactory.

A further object of this invention is to provide a system in which a large part of the cooling is accomplished by the natural cooling influence incident to exposure of water to the atmosphere whereby the water temperature is reduced to substantially its wet bulb temperature.

Still another object of this invention is to provide a system for conditioning air in which the cooling influence of water at its wet bulb temperature may be supplemented by other cooling means which may have a strong dehumidifying action.

A system and certain details according to this invention are more or less diagrammatically illustrated in the accompanying drawing, in which Fig. 1 is a diagrammatic showing of the system as a whole;

Fig. 2 is a plan view of a heat exchange element of the supplemental cooling and dehumidifying unit; and Fig. 3 is a plan view of a gas compressor having a clutch in the drive.

The system comprises essentially a heat exchange unit in which air to be pressed into a building is caused to pass through a cooling unit in heat exchange relation, but out of direct contact, with water which has been reduced in temperature to substantially the wet bulb temperature of the atmosphere. After passing through this cooling unit, the partially cooled air may pass through a second heat exchange unit, which may be cooled to a much lower temperature. The temperature of this unit may be maintained below the dew point of the air so that partial dehumidification occurs. The construction of this unit is such that only part of the air is contacted with the cold elements.

In the embodiment illustrating the invention, a motor 1 drives blower 2 which draws air from the atmosphere and blows it over the coils of a heat exchange element 3. This heat exchange element comprises a series of tubes 4 through which cold water flows in a direction countercurrent to the direction of the air so that the coldest air comes into contact with the coldest tubes, thus obtaining efficient heat transfer.

The water for cooling the tubes 4 flows in a cyclic system through which it is pumped by pump 5, driven by motor 1. On leaving the tubes 4, the water has had its temperature raised to some extent by absorption of heat from the air under treatment, and it then flows through conduit 6 to the top of a cooling tower 7 over which it flows in attenuated condition in contact with atmosphere. This cooling tower may be of conventional construction and is preferably located on the roof of the building 22 to be cooled where it would be reached by the natural breeze. If desired, a forced draft may be provided, in which case the tower or its equivalent may be located indoors. In flowing over the tower, the temperature of the water is reduced substantially to or within a few degrees of the wet bulb temperature of the atmosphere. The water is then collected in basin 8 and from which it flows through pipe 23 to pump 5 by which it is again pumped through the system. The temperature of the water may be further reduced closer to the wet bulb temperature by passing a part of the cold water directly back to the top of tower 7 through conduit 9 controlled by valve 10. It will be noted that by this system the water for cooling the air may be cooled with no expenditure of power except that for pumping the water through the system.

It is well known that much of the discomfort of hot weather in some localities is caused by the high humidity of the atmosphere, and for this reason it is oftentimes desirable to dehumidify the air to some extent as well as to cool it. To this end, heat exchange element 11 is provided in the air conduit 12 leading from tubes 4 to the building 22 to be cooled. Heat exchange element 11 is cooled by expansion of gases therein whereby it is reduced to a much lower temperature than tubes 4, in fact, it is usually desirable to reduce this temperature below the dew point of the air passing to the building. It would be undesirable to cool all of the air to so low a temperature and for this reason the tubes 13 of the heat exchange element are spaced apart substantial distances, for instance 12 inches. The tubes may be provided with transversely disposed cooling fins 14 which are likewise spaced apart. In passing through this heat exchange device only a small part of the air comes into contact with the tubes 13 or the cooling fins 14, hence, only a small percentage of the air is directly affected thereby. That air which does contact with the tubes and fins is reduced to so low a temperature that much of its moisture is precipitated and deposited. This cold dry air then mixes with the other air whereby the entire air flow is reduced to somewhat lower temperature and humidity.

The apparatus for cooling the tubes 13 may comprise any form of mechanical refrigeration unit which is diagrammatically shown as a compressor 15, heat dissipator 16, expansion valve 17, headers 18 and 19, and return conduit 20. The compressor may be driven by a separate motor or by motor 1, and in case it is to be driven by motor 1, a clutch 21 is preferably provided, so that the supplemental cooling unit may be altogether thrown out of operation at times when the humidity becomes so low that dehumidification would be unnecessary.

The above-described system is suitable for all types of climates where it is uncomfortably hot and is also useful in controlling air conditions in hospital rooms in the treatment of certain diseases.

Assuming now a dry climate and a temperature of 100° F. and a wet bulb temperature of 70° F., the water collected from the cooling tower would be about 73° F. In case the partial by-pass conduit 9 were used, the temperature of the water would be further reduced one or two degrees. The water passes to tubes 4 where it absorbs heat from the air which is reduced to about 75° F. In a dry climate it would probably be unnecessary to use the supplemental cooling and dehumidifying unit, except perhaps during the rainy season of the year. If it is used, the temperature of the air will be further reduced several degrees and also dehumidified to some extent.

In a wet climate with a temperature of 95° F. and a wet bulb temperature of 75° F., the temperature of the water collected from the tower would be about 77° F. It would then be possible to cool the air to about 78½° F. and, with the mechanical refrigeration unit in operation, it could be further reduced another 5° with dehumidification, which in this case would be more important than in a dry climate.

We claim:

1. In a system for conditioning air for buildings, a circulatory water system including means for contacting the water with the atmosphere, a heat exchange device and means for circulating the water in the system, means for impelling a stream of air through the heat exchange device into the building, and means in the air stream for reducing the temperature of part of said stream passing from the heat exchange device to the building to below the dew point to precipitate part of the moisture content whereby the stream of air entering the building is partially dehumidified without reducing the temperature of the air flow as a whole to below its dew point.

2. In a building cooling system, an air and water contact device, means for supplying a flow of water to the top of said contact device, said contact device having means for breaking up the flow of water into attenuated condition while exposing it to the atmosphere whereby the temperature of the water is reduced to approximately the wet bulb temperature of the atmosphere, a collecting basin for collecting the water from the contact device, a heat exchange device comprising a series of tubes, means for supplying water from the collecting basin to the series of tubes and for returning the water from said tubes to the top of the contact device, a conduit for by-passing part of the water from the collecting basin directly to the top of the contact device, means for driving air over said tubes countercurrent to the direction of flow of the cold water through said tubes, and means for conducting said air into the building to be cooled.

3. Apparatus for cooling and desiccating air comprising a circulatory water cooling system including an air and water contact device for cooling water and a countercurrent heat exchange device, means for conducting air through said heat exchange device, a mechanical refrigeration unit including a gas compressor, a heat dissipator, an expansion valve and means for reducing a part only of the air below its dew point, said means having a plurality of tubes spaced apart substantial distances to permit air to pass therebetween without contact therewith, said tubes being maintained at a temperature below the atmospheric dew point, means for conducting the air from the heat exchange device over said tubes whereby moisture is precipitated therefrom, and means for conducting the cooled, dried air to the building.

4. Apparatus for cooling and desiccating air comprising a circulatory water cooling system including an air and water contact device and a countercurrent heat exchange device, conduits for conducting water from the air and water contact to the heat exchange device and back to the air and water contact device, a conduit for by-passing part of the water from the air and water contact device around the heat exchange device, means for conducting air through said heat exchange device, a mechanical refrigeration unit including a gas compressor, a heat dissipator, an expansion valve and a heat absorber, the heat absorber comprising a plurality of tubes spaced apart substantial distances, said tubes being maintained at a temperature below the atmospheric dew point, heat conductive fins disposed transversely to the tubes and in contact therewith and spaced apart from each other substantial distances, means for conducting the air from the heat exchange device over said tubes and fins whereby the temperature of part of the air flow is reduced below its dew point and moisture is precipitated, and means for conducting the cooled, dried air to the building.

5. A system for conditioning air for buildings comprising a water circulatory cooling system including an air and water contact device, a heat exchange device, conduits between said devices and a pump for circulating the water in the water cooling system, a mechanical refrigeration unit comprising a compressor and a heat absorber, a blower for blowing air through the heat exchange device and heat absorber into a building, a motor, driving connections between said motor and the pump, blower and compressor, and a clutch in the driving connection with the compressor whereby the mechanical refrigeration may be disconnected when desired.

GEORGE P. TIDMARSH.
PATRICK M. TIDMARSH.